Aug. 14, 1962  J. B. NICHOLS  3,049,321

AMPHIBIOUS AIRCRAFT

Filed July 20, 1959

INVENTOR.
John B. Nichols
BY
*Fryer + Johnson*
ATTORNEY

United States Patent Office 3,049,321
Patented Aug. 14, 1962

3,049,321
AMPHIBIOUS AIRCRAFT
John B. Nichols, Atherton, Calif., assignor, by mesne assignments, to Hiller Aircraft Corp., Palo Alto, Calif., a corporation of California
Filed July 20, 1959, Ser. No. 828,365
5 Claims. (Cl. 244—17.19)

This invention relates to amphibious aircraft, and more particularly to aircraft of the rotary wing type adapted to land and take off selectively from either land or water.

It is an object of this invention to provide an amphibious rotary wing aircraft which is easily converted selectively for either water or air navigation.

It is a further object of this invention to provide an amphibious rotary wing aircraft having means for inactivating the tail rotor during water travel to prevent damage thereto.

The aircraft embodying features of this invention would include a buoyant hull or floats adapting the aircraft for travel on the surface of a body of water. A tail boom extending rearwardly from the hull rotatably carries the conventional anti-torque tail rotor which is driven by shafting or other power transmission device from the main engine. A small water rudder is pivotally mounted on the hull to control directional navigation of the plane across a body of water, such a rudder having virtually no effect on the performance of the aircraft while it is in flight. Interposed in the drive means for the tail rotor is a mechanism for disengaging it operatively from the main power plant while the craft is afloat so that rotation of the tail rotor will stop to prevent damage thereto without interrupting rotation of the main rotor. The main rotor blades propel the hull along the surface of the water while steering is accomplished by means of the small water rudder.

Other objects and advantages of this invention will become apparent from the specification following when read in connection with the accompanying drawings wherein.

Figure 1:
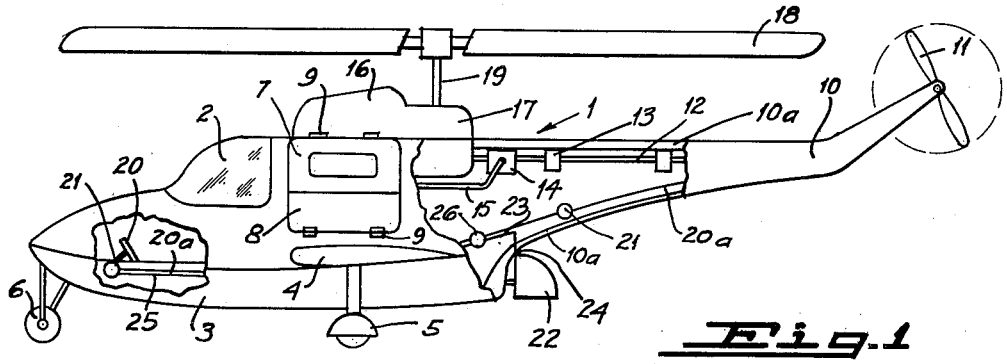
FIG. 1 is a more or less schematic side of view of an amphibious helicopter embodying features of this invention.

Referring now to the drawings in greater detail, the aircraft includes a fuselage 1 including a main cabin 2 carried on a water tight, buoyant hull 3 of stream line design adapting it for movement along the surface of a body of water. Protruding from the sides of the fuselage above the buoyant hull 3 is a pair of stub wings 4 in which may be encased retractable landing gears 5. The stub wings 4 themselves are buoyant and may serve as hydrofoils to increase the stability of the craft while afloat on a body of water. If desired a third landing gear may be provided at the forward end of the fuselage, or the bow as it were. While an integral fuselage and hull have been shown, it is to be understood that the fuselage may be supported on separate, conventional floats.

Access to the cabin is gained through a pair of doors 7 and 8, each mounted on hinges 9 to pivot about a horizontal axis. Appropriate seals are provided around the doors so that they are water tight when closed. The top door 7 may be opened separately and will itself present ample opening for persons to enter or leave the ship. The bottom door 8 latches to the fuselage and will remain closed and sealed even though the top door 7 is opened. Under this arrangement, the top door 7 only need be opened to insure adequate clearance above the water line when the craft is afloat, but the double doors provide full access to load and unload cargo when on land or in calm water.

Rotatably carried at the extremity of the tail section 10 is the conventional tail rotor 11 provided to control and neutralize torque introduced by the unidirectional rotation of the rotor. The rotor may be driven by a suitable drive shaft 12 rotatably carried in bearings 13 secured to the frame 10a along the tail section. The drive shaft 12 is keyed to one element of a conventional mechanical clutch 14, preferably of the multiple disc type, the other element of the clutch being driven by an internal combustion engine 16 or other suitable source of power, through a reduction gear unit 17. Preferably, the engine 16 and the gear box 17 are mounted on top of the cabin. The clutch 14 may be selectively engaged or disengaged by the pilot through any suitable mechanism, such as the linkage 15 here shown generally. The lift rotor blades 18 carried on the central column 19 are also driven by the engine 16 through the gear box 17 so that the main rotor and tail rotor normally rotate together.

Flight direction or yaw is controlled by varying the pitch of the tail rotor blades 11 in the conventional manner in response to actuation of foot pedals 20 in the pilot's cabin 2. Manipulation of the foot pedals produces longitudinal movement of a cable 20a over pulleys 21 rotatably carried on the frame 10a.

Figure 2:
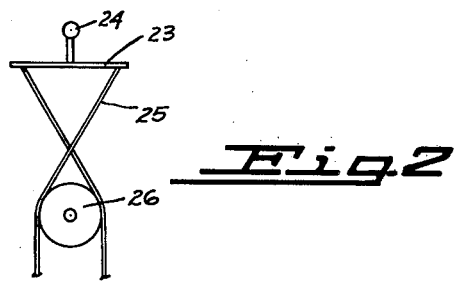
FIG. 2 is a schematic representation of a rudder operating mechanism forming a part of this invention.

As a particular feature of this aircraft, I provide a small water rudder 22 journalled in the hull 3 for oscillatory movement in response to pilot control. While any suitable mechanism may be employed for this purpose, I provide a T-lever 23 (FIG. 2) or similar device rigidly secured to a shaft 24 rotatably mounted through the frame 10a to be turned by movement of another cable 25 reeled over a pulley 26 and operated by the foot pedals 20 simultaneously with the tail rotor pitch control. The T-lever shaft 23 is journalled in the hull and adapted to oscillate the water rudder 22 secured thereto and mounted at the rear of the hull 3. Any similar suitable operating mechanism for the rudder 22 may be substituted, it being mainly significant that there is provided a rudder operable by means of flight direction controls 20 to steer the amphibious aircraft over the water. Thus, when the aircraft is in flight, the water rudder 22 oscillates more or less idly and the aircraft yaw is controlled by adjustment of the tail rotor pitch. However, in the increased resistance of water, the tail rudder performs a more pronounced function and can be used to navigate the craft as it is propelled forward by pitch control of the main rotor blades.

Since the clutch 14 is interposed in the tail rotor drive shaft 12, the tail rotor 11 may be disengaged and inactivated without affecting the continued operation of the main rotors 18 while the aircraft is moving over a body of water. This precludes damage to the tail rotor which might otherwise occur if the tail boom 10 were to dip carrying the rotating tail rotor in contact with the water, or simply be hit by a wave in heavy seas. Of course, navigability is not sacrificed because the water rudder 22 is at this stage, completely effective.

Figure 3:
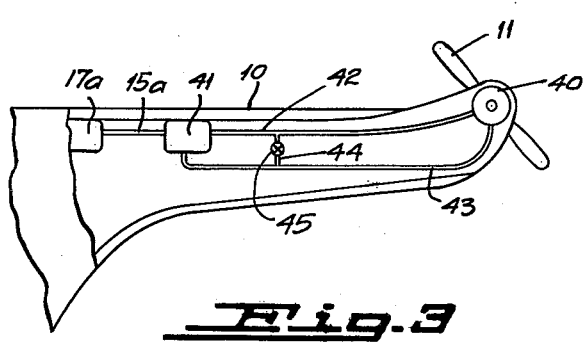
FIG. 3 is a partial section view showing an alternate form of tail rotor power means to be used in conjunction with this invention.

In FIG. 3, an alternate form of tail rotor operating means is shown generally. In this instance, a hydraulic motor 40 is provided at the tail portion 10 to drive the tail rotor 11 directly, fluid being supplied under pressure from a hydraulic pump 41 driven by shaft 15a from the gear box 17a. The fluid is forced by the pump 41 through a delivery conduit 42 to the motor and then returned through return line 43. The delivery conduit is connected directly to the return line by means of a bypass conduit 44 in which is interposed a suitable valve 45 which may be selectively manually or electrically opened to cause the fluid from the pump to bypass the motor and inactivate the tail rotor 11.

With either of the forms of FIGS. 1 and 3, the aircraft is flown by pitch control of the main rotor blades 18 with the tail rotor 11 rotating simultaneously to enable the pilot to control direction and to balance torque continuously by manipulation of the foot pedals controlling pitch of the tail rotors 11. During flight, the foot pedal cables also oscillate the small rudder at the rear of the hull but this has virtually no effect upon the flight characteristics. When the helicopter is settled down onto the surface of the water, the clutch of FIG. 1 or the by-pass valve of FIG. 3 may be operated to interrupt rotation of the tail rotor in order to prevent damage thereto. In the meantime, the same manipulations of the foot pedals that are employed in controlling the fuselage heading while in flight continue to operate the cables 25, but since pitch changes in the disengaged tail rotor have no operational effect, only the water rudder is functional. Pivotal movements of the water rudder in the increased resistance of the water controls the steering of the aircraft.

While I have described and illustrated the preferred embodiments of my invention, it is obvious that changes and modifications thereto can be made without departing from the spirit and scope of my invention which I intend to be limited by the claims appended hereto.

Having described my invention I claim:

1. An amphibious rotary wing aircraft comprising a fuselage and a tail boom integrally connected with said fuselage, said fuselage at its bottom consisting of a buoyant contoured water tight hull integral with said fuselage and adapting said aircraft to land upon and be navigable in a body of water, means on said fuselage for stabilizing said aircraft on such body of water, said tail boom extending rearwardly of said fuselage above said hull so as to be positioned above the surface of a body of water when said aircraft is supported thereon, a main rotor structure rotatably mounted above said fuselage, a power source for rotating said main rotor structure, a torque compensating tail rotor rotatably mounted on said tail boom, pilot operable means for controlling the pitch of the blades of said tail rotor, drive means normally operatively connecting said tail rotor with said power source, mechanism for selectively operatively disengaging said tail rotor from said power source interposed in said drive means between said power source and said tail rotor, means to prevent damage to said tail rotor which might otherwise occur should said hull rock while the tail rotor is rotating and strike the water including a pilot operable control member for controlling said mechanism to operatively disengage said tail rotor, and pilot operable rudder means pivotally mounted on said buoyant hull, said rudder means being positionable beneath the surface of a body of water when said aircraft is supported thereon for controlling navigational direction of movement of said aircraft over such body of water.

2. The aircraft of claim 1 including structure operatively connecting said pilot operable rudder means and said means for controlling tail rotor pitch so that pivotal movement of said rudder and change of pitch of said tail rotor are regulatable by the same pilot operable means.

3. The aircraft of claim 1 in which said drive means comprises a drive shaft extending from said power source and a driven shaft connected to said tail rotor, and in which said mechanism for selectively operatively disengaging said tail rotor from said power source comprises a clutch operatively interposed between said drive shaft and said driven shaft.

4. The aircraft of claim 1 in which said drive means operatively connecting said tail rotor with said power source comprises a pressure fluid operated motor connected to said tail rotor, a pressure fluid pump driven by said power source, a conduit for carrying pressure fluid from said pump to said motor, and a return conduit for carrying fluid from said motor to said pump, and in which said mechanism for selectively operatively disengaging said tail rotor from said power source comprises a bypass conduit interconnecting said pressure and return conduits, and a selectively operable valve in said bypass conduit.

5. An amphibious rotary wing aircraft comprising a fuselage and a tail boom integrally connected with said fuselage, said fuselage at its bottom consisting of a buoyant contoured water tight hull integral with said fuselage and adapting said aircraft to land upon and be navigable in a body of water, a pair of buoyant stub wings extending laterally from said hull for stabilizing said aircraft on such body of water, said stub wings including landing gear retractable thereinto adapting said aircraft for landing on a solid landing surface, said tail boom extending rearwardly of said fuselage above said hull so as to be positioned above the surface of a body of water when said aircraft is supported thereon, a main rotor structure rotatably mounted above said fuselage, a power source for rotating said main rotor structure, a torque compensating tail rotor rotatably mounted on said tail boom, pilot operable means for controlling the pitch of the blades of said tail rotor, drive means normally operatively connecting said tail rotor with said power source, mechanism for selectively operatively disengaging said tail rotor from said power source interposed in said drive means between said power source and said tail rotor, means to prevent damage to said tail rotor which might otherwise occur should said hull rock while the tail rotor is rotating and strike the water including a pilot operable control member for controlling said mechanism to operatively disengage said tail rotor, and pilot operable rudder means pivotally mounted on and depending from said buoyant hull, said rudder means being positionable beneath the surface of a body of water when said aircraft is supported thereon for controlling navigational direction of movement of said aircraft over such body of water.

References Cited in the file of this patent

UNITED STATES PATENTS

| | | |
|---|---|---|
| 1,699,991 | Rohrback | Jan. 22, 1929 |
| 2,448,064 | Wallace | Aug. 31, 1948 |
| 2,581,923 | Campbell | Jan. 8, 1952 |
| 2,702,171 | Katzenberger | Feb. 15, 1955 |
| 2,707,084 | Mills | Apr. 26, 1955 |
| 2,711,077 | Adams | Feb. 22, 1955 |